Patented May 15, 1951

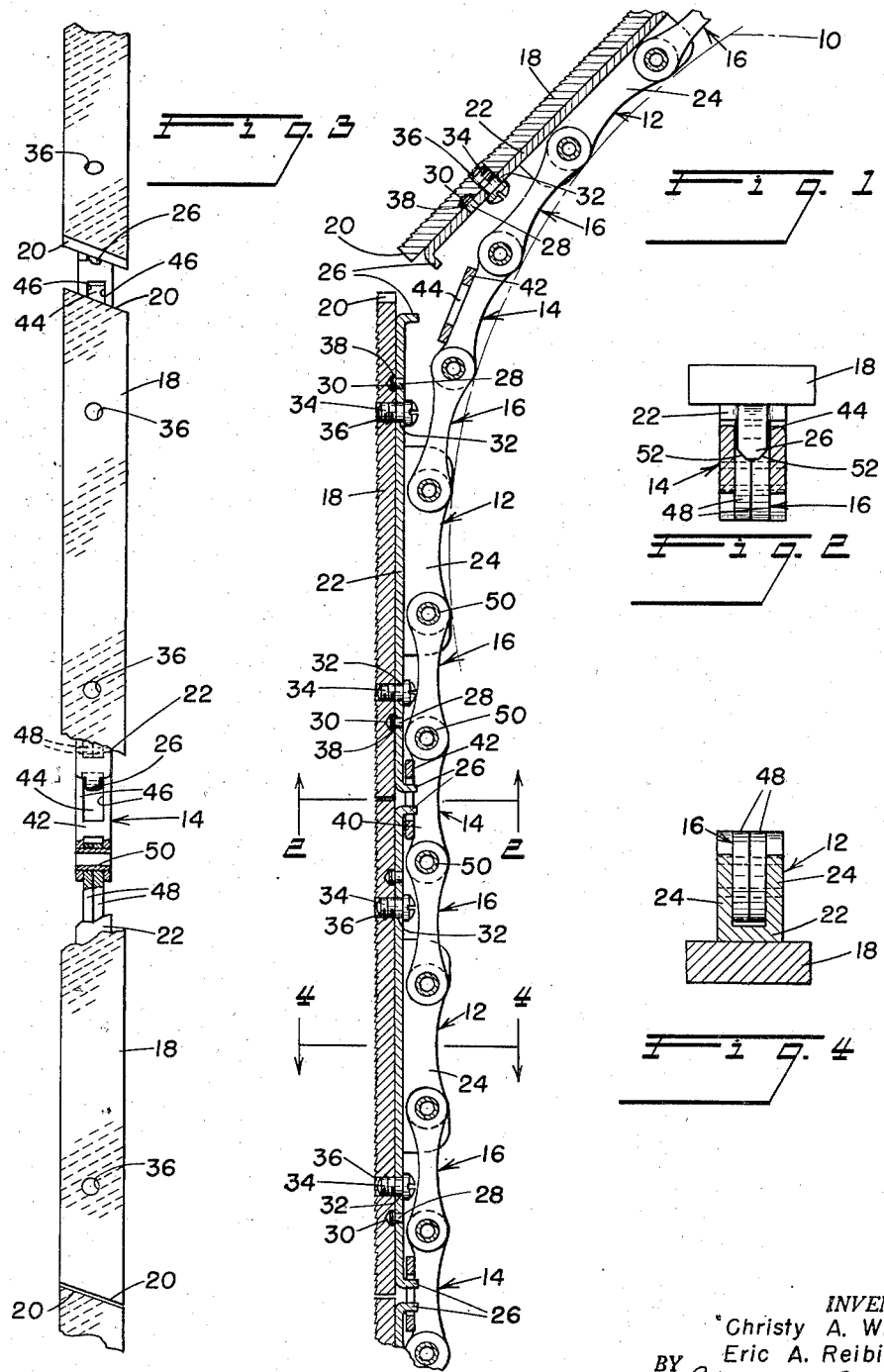

2,552,611

UNITED STATES PATENT OFFICE 2,552,611

ENDLESS TOOL CARRIER CHAIN

Christy Arther Wiken and Eric A. Reibig, Milwaukee, Wis., assignors to Rockwell Manufacturing Company, Pittsburgh, Pa., a corporation of Pennsylvania Application November 15, 1946, Serial No. 710,058

4 Claims. (Cl. 29—79)

This invention relates to flexible tool carriers, preferably of the endless chain type, in which the individual tools are mounted upon flexibly connected spaced carrier links of the chain for movement in successive order through a working zone. Generically considered, it is the aim and purpose of the present invention to provide simple and positively functioning means for maintaining said carrier links and the tools mounted thereon in perfect longitudinal alignment in the run of the endless chain between vertically spaced supporting and driving pulleys.

More particularly, this invention has reference to filing or abrading machines of the continuous motion type, such as that shown in the patent to Grob et al., 2,322,684, of June 22, 1943, in which elongated file elements are rigidly fixed to spaced carrier links of a vertically disposed continuously movable endless chain for engagement with the work piece in immediate successive order, as one run or stretch of the chain moves through the working zone. In this patent, and in the earlier Grob Patent 2,208,543 of July 16, 1940, there is disclosed a means designed to insure accurate longitudinal alignment of the adjacent file elements at their mating ends in the vertical stretch or run of the chain, and which permits of a relative separating angular movement of said ends of the file elements as the chain flexes in its movement about the supporting and driving pulleys. However, in each of these patented devices, there is provided a tongue or key to engage in a slot or groove in the end of the file element, which results in an unavoidable and more or less rapid wear of the tongue or key, causing looseness to develop in the connection after a short period of use, and inaccuracy in the exact longitudinal alignment of the file elements. Also, in view of the structural alteration of the ends of the file elements from the conventional form, their replacement is an appreciable item of expense. Further, this grooving or recessing of the ends of the file elements, which project an appreciable distance beyond the ends of the carrier links of the chain, has a weakening effect with the ever-present danger that these projecting ends of the file elements will be chipped or broken under working pressures, making more or less frequent replacement thereof necessary.

Accordingly, it is an important object of the present invention to provide an aligning means for endless file carrier chains of the above type whereby the practical deficiencies of these prior suggestions are successfully remedied, and in which absolutely accurate or perfect alignment between the file elements is maintained without necessitating structural alterations of any kind in the mating ends of the file elements.

Another object of the invention is to provide a file carrier link of improved construction whereby the file element is strongly backed by said link substantially throughout its length.

A further object of the invention resides in the provision of means flexibly connecting adjacent file carrying links, embodying an aligning link element, and terminal means on each carrier link coacting with means on said aligning link element to guide and direct said carrier links and the files thereon into perfect longitudinal alignment with each other, after passing around the supporting and driving pulleys.

It is a more particular object of the invention in one embodiment thereof to provide a novel chain link assembly, in which the file carrying links are flexibly connected with the aligning links by intermediate links, said aligning links having parallel side portions connected by a slotted bridge and the file backing end portions of the carrier links extend beyond the intermediate links and terminate in angularly disposed guiding and aligning lugs coacting with the side walls of the slot in the bridge of the aligning link. In this manner, an effective, perfectly aligned connection between the file carrying links is assured, and relative displacement of the mating ends of the files either laterally or transversely of the chain is substantially precluded.

Finally, the present invention provides aligning means for tool carrier chains which is of rugged and durable construction, will more efficiently and reliably function than prior suggestions of this kind, and in which the coacting tool aligning parts are elements of the chain links which may be readily replaced when necessary at nominal cost, whereby the maintenance expense of filing or other machine tools of this type is reduced to a minimum.

With the above and other subordinate objects in view, the invention comprises the improved flexible tool carrier and the construction and relative arrangement of its several parts, as will hereinafter be more fully described, illustrated in the accompanying drawings, and subsequently incorporated in the subjoined claims.

In the drawings, wherein I have shown one simple and practical embodiment of the present invention, and in which similar reference characters designate corresponding parts throughout the several views:

Figure 1 is a fragmentary longitudinal sectional view of an endless abrasive carrier, constructed in accordance with one embodiment of the invention;

Figure 3 is an enlarged transverse sectional view taken substantially on the line 2—2 of Figure 1;

Figure 3 is a front side elevation with certain parts broken away; and

Figure 4 is an enlarged transverse section taken on the line 4—4 of Figure 1.

As shown in Figure 1 of the drawings, in a machine equipped with our improved tool carrying chain, the illustrated vertical portion or stretch of the chain is adapted to pass downwardly, between suitable guides (not shown), from an upper supporting pulley 10 through the working zone to and about a lower pulley. Either pulley may be used as the driving pulley for the chain.

In the embodiment of the invention selected for purposes of illustration, the endless flexible chain embodies suitably spaced tool carrying links 12, the adjacent tool carrying links being flexibly connected by an aligning link 14 and intermediate links 16. In the present instance, the links 14 and 16 are comparatively short and of substantially the same length, while the tool carrying links 12 are relatively long.

Each link 12 carries a tool element, which in the present instance is in the form of an elongated abrading member or file 18. This file is of standard construction, having diagonally cut parallel end faces 20. The carrier links 12 comprises a relatively narrow backing plate 22 for the file 18, which is of substantially co-equal length therewith and is provided along its opposite side edges with the relatively short, longitudinally extending flanges 24, which terminate in equidistantly spaced relation from the opposite ends of the link plate 22. This plate at each of its ends terminates in a lug 26 of reduced width, angularly projecting in the same direction as the side flanges 24.

In longitudinally spaced relation from each of the lugs 26, a locating stud 28 is riveted or otherwise securely fixed in the link plate 22, and preferably has a cylindrically formed head 30. Adjacent to each stud and longitudinally spaced therefrom, the plate 22 is also provided with an opening 32 to receive an attaching screw 34 for the file element 18, which is provided in spaced relation from each end with a threaded aperture 36 to receive said screw. The locating studs 28 and the apertures 32 are accurately located on the longitudinal center line of the link plate 22, which is in perfect parallelism with the flanges 24 and the opposite side edges of the link. Similarly, the apertures 36 and the drilled recesses 38 are accurately located on the center line of the file 18, so that when mounted on the link 12, the opposite side edges of the file are in perfect parallelism with the opposite side edges of the link 12. In mounting the file 18 on the link, the cylindrical heads of the locating studs 28 seating in the recesses 38 quickly and accurately position the file with the threaded apertures 36 in registration with the openings 32 in the link plate to receive the screws 34, whereby the file is easily and quickly rigidly attached to the outer side face of the link plate 22.

Each aligning link element 14 comprises parallel side portions 40 integrally connected along corresponding longitudinal edges by an intermediate transverse web or bridge 42, which is provided with a longitudinally elongated slot 44 having opposite side edges 46 in exact parallelism with the side portions 40 of the links.

The intermediate connecting links 16 between the two carrier links 12 and the aligning link 14 preferably each consist of two flat link elements 48 of standard construction and corresponding length and form, arranged in face-to-face contact, and fitting at one of their ends in close clearance relation between the flanges 24 of a carrier link 12 and at their other ends between the spaced ends of the side portions 40 of the aligning link 14. The two link elements 48 of standard thickness are used, for reasons of economy, and if desired, it will be understood that a single link element may be employed.

The flanges 24 of the two file carrying links and the side portions 40 of the aligning links are provided adjacent their ends with openings to register with similar openings in the ends of the intermediate connecting links 16, said registering openings receiving the bushings 50. These bushings have a tight driving fit in the openings of link elements 16, and a loose fit within the openings of the link elements 12 and 14, whereby the several link elements are flexibly connected to each other for relative angular movement.

It will be particularly noticed that each end portion of the backing plate 22 of link 12 extends beyond or over the intermediate link 16 and between the bridging web 42 of a link 14 and the file 18. In the straight section of the chain, the terminal lugs 26 of the file carrier links extend inwardly through the slot 44 of the bridge 42. Preferably, the side and end faces of the lugs 26 are connected by the inwardly bevelled or chamfered surfaces 52, for a purpose which will presently be explained.

From the above description, it will be apparent that as the endless chain passes around the pulley 10, the adjacent carrier links 24 assume a relative angular position, and the proximate ends of the files 18 carried by said links assume a similar angular relationship with their end faces 20 separated from each other, as clearly shown in Figure 1 of the drawings.

As the chain straightens out in leaving the pulley, the connecting links 14 and 16 cause the carrier links 12 to assume a straight line position, the ends of the carrier link plates 22 and the ends of the files 18 moving inwardly toward the aligning link 14. In the approach of the terminal lugs 26, the bevelled or chamfered edges 52 thereof coact with the opposite parallel edges 46 of the slot 44 in the bridge 42 as the lugs are projected through said slot. In this way, perfect longitudinal alignment of the carrier links 12 and the files 18 thereon is assured, with the end faces 20 of the files in closely opposed relation so that the outer abrading surfaces of these file elements, in their passage through the working zone, lie in a common plane and present an abrading surface of substantially unbroken continuity for contact with the work. While in the present instance we have shown the files as having flat abrading surfaces, it will of course be understood that if desired these surfaces may be transversely convex or of any other desired shape or form, as may be required for the particular machine operation.

It will be noted that since the ends of the plates 22 of adjacent carrier links extend longitudinally over and beyond the intermediate connecting links 16 and to the extreme ends of the files 18 between the same and the bridging web 42 of the aligning link 14, a substantially rigid backing for the aligned ends of the files is provided which obviates relative transverse displacement of the file ends under working pressure as said ends of the files successively move into and out of contact with the work piece, thus maintaining a common line of tangency between the abrading surfaces of the files and the work piece. Since the elements of the aligning means are structural parts of the chain links so that grooving or slotting of the file ends is avoided, there is little or no likelihood that these end edges of the files will be broken or chipped under the working pressures.

While we have above described a preferred arrangement of the carrier chain link and file aligning elements, it will be obvious that the male and female parts thereof may be reversed and the aligning link 14 formed with a central web portion to be received in notches or recesses provided in the lugs 26 formed on the carrier link plates 22. Of course, it will be understood that the side flanges 24 of the file carrier links and the side portions 40 of the aligning links 14 have a close sliding fit between the side walls of the stationary chin guide with which such machines are commonly equipped.

From the foregoing description and the accompanying drawings, it will be seen that we have provided an aligning means for flexible tool carriers which is particularly desirable for use in filing or abrading machines, since the aligning means effectively functions to maintain perfect alignment between the successive files, without frictional contact with the file ends and the incident excessive wear of the abrasive elements and possible breakage or chipping thereof, which would allow relative lateral displacement of the file ends. Also, the improved aligning means permits the use of file elements of standard construction. As the aligning lugs 26 of the carrier links are positioned in spaced relation from the ends of the slots 44, more or less stretch of the chain is possible, said lugs coacting with the parallel side edges 46 of the slot to at all times accurately guide the file elements into perfectly aligned relation with each other. If at any time the proper functioning of the aligning means should become impaired, due to accident or excessive wear, the link elements 12 and 14 of the chain can be readily replaced at nominal cost without requiring the more expensive replacement of the file elements, as in the patented constructions heretofore mentioned. It will further be appreciated that our novel aligning means is of inexpensive and structurally durable form and will at all times be unobstructed in the proper cooperation of its parts by the presence of grinding grit or other foreign matter.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In an abrasive device for abrading machines, a flexible carrier comprising a plurality of longitudinally spaced rigid carrier links, an abrasive element secured to each carrier link, said links and elements being of substantially co-equal length, means flexibly connecting said carrier links including aligning links, each aligning link having interlocking means intermediate of its ends, the opposed ends of adjacent abrasive elements having relative angular movement in the flexing of the carrier, the proximate end portions of the carrier links extending between the abrasive elements and said aligning links and having means coacting with the interlocking means on said aligning links to maintain the opposed ends of said elements in accurate longitudinal alignment in the rectilinear movement of the carrier through the working zone of the machine.

2. The abrasive device as defined in claim 1, wherein said means on the ends of the carrier links comprises angularly disposed terminal lugs having separable interlocking engagement with the interlocking means on the aligning links to restrain the carrier and the aligning links against relative lateral displacement.

3. The abrasive device as defined in claim 1, wherein said interlocking means on the aligning links comprises a slotted web having separable interlocking engagement with terminal parts on the carrier links to restrain said carrier and aligning links against relative lateral displacement.

4. In a flexible multiple tool carrier adapted to successively move the tools in a rectilinear path through a working zone, rigid longitudinally spaced carrier links for individual tools, means flexibly connecting said carrier links for relative annular movement including an aligning link element, angularly disposed lugs integrally formed on the proximate ends of said carrier links, and said aligning link element between its ends having an integral part guidably coacting with said lugs in relative movement of the carrier links to aligned position to establish an interlocked connection restraining the tool carrier links and the aligning link element against relative lateral displacement and maintain said carrier links in accurate longitudinal alignment during movement thereof through the working zone.

CHRISTY ARTHER WIKEN.
ERIC A. REIBIG.

REFERENCES CITED

The following references are of record in the file of this patent:

UNITED STATES PATENTS

| Number | Name | Date |
| --- | --- | --- |
| 2,208,543 | Grob | July 16, 1940 |
| 2,243,757 | Kohls et al. | May 27, 1941 |
| 2,269,749 | Wilkie | Jan. 13, 1942 |